(12) United States Patent
Brouwers

(10) Patent No.: US 11,529,634 B2
(45) Date of Patent: Dec. 20, 2022

(54) REPLACEABLE WORK PART FOR A DEMOLITION TOOL

(71) Applicant: Caterpillar Work Tools B.V., BJ 's-Hertogenbosch (NL)

(72) Inventor: Jeroen Brouwers, NS Gemert (NL)

(73) Assignee: Caterpillar Work Tools B.V., s-Hertogenbosch (NL)

(*) Notice: Subject to any disclaimer, the term of this patent is extended or adjusted under 35 U.S.C. 154(b) by 336 days.

(21) Appl. No.: 16/331,913

(22) PCT Filed: Sep. 12, 2017

(86) PCT No.: PCT/EP2017/072947
§ 371 (c)(1),
(2) Date: Mar. 8, 2019

(87) PCT Pub. No.: WO2015/050662
PCT Pub. Date: Mar. 22, 2018

(65) Prior Publication Data
US 2019/0193084 A1 Jun. 27, 2019

(30) Foreign Application Priority Data
Sep. 15, 2016 (EP) .................................. 16188989

(51) Int. Cl.
*B02C 1/10* (2006.01)
*E02F 3/96* (2006.01)
(52) U.S. Cl.
CPC ................ *B02C 1/10* (2013.01); *E02F 3/965* (2013.01); *B02C 2210/02* (2013.01)

(58) Field of Classification Search
CPC ......... B02C 1/10; B02C 2210/02; B02C 1/00; B02C 1/02; B23D 35/002; B23D 17/00; E02F 3/965
See application file for complete search history.

(56) References Cited

U.S. PATENT DOCUMENTS 3,153,512 A 10/1964 Polzin
5,142,779 A 9/1992 Labounty
(Continued)

FOREIGN PATENT DOCUMENTS

CN 104350209 B 8/2016
DE 102006019069 A1 10/2007
(Continued)

OTHER PUBLICATIONS

International Search Report for related International Application No. PCT/EP2017/072947; dated Jan. 12, 2017.
(Continued)

*Primary Examiner* — Faye Francis

(57) ABSTRACT

A replaceable work part which has a base and a tooth portion provided on an upper side of the base. A plurality of mounting legs extend downward from the base. Each mounting leg defines a recess and is configured to engage a corresponding mounting structure formed on a jaw of the jaw assembly. The replaceable work part is mounted to the jaw by being inserted into the same from above and sliding the same onto the jaw in a sliding direction to engage the mounting legs with the mounting structures of the jaw. In this state, locking members are inserted between the replaceable work part and the jaw and secured to the replaceable work part to restrict movement of the replaceable work part in the direction opposite to the mounting direction.

15 Claims, 4 Drawing Sheets

(56) References Cited

U.S. PATENT DOCUMENTS

| | | | |
|---|---|---|---|
| 5,474,242 A | 12/1995 | Rafn | |
| 5,671,892 A * | 9/1997 | Morikawa | E02F 3/965 241/266 |
| 6,092,290 A * | 7/2000 | Vogelsanger | B23D 17/06 30/228 |
| 6,957,786 B2 | 10/2005 | Bratton et al. | |
| 7,284,718 B2 * | 10/2007 | Christenson | E02F 3/965 241/266 |
| 8,256,698 B2 | 9/2012 | Holmes | |
| 8,628,035 B2 | 1/2014 | Ramun | |
| 9,815,128 B1 * | 11/2017 | Jensen | B25J 15/0033 |
| 10,316,530 B2 * | 6/2019 | Van Gemert | B02C 1/10 |
| 10,392,776 B2 * | 8/2019 | Van Gemert | E02F 3/965 |
| 10,668,475 B2 * | 6/2020 | Raihala | E02F 3/965 |
| 10,967,380 B2 * | 4/2021 | Johnson | B23D 17/06 |
| 2007/0245568 A1 * | 10/2007 | Schipp | E04G 23/082 30/134 |
| 2013/0327864 A1 | 12/2013 | Gemert | |
| 2014/0231564 A1 * | 8/2014 | Van Gemert | E02F 3/3618 241/264 |
| 2015/0048190 A1 | 2/2015 | Peitomaki | |
| 2015/0115086 A1 | 4/2015 | Gemert | |

FOREIGN PATENT DOCUMENTS

| | | | |
|---|---|---|---|
| EP | 1655469 A1 | 12/2013 | |
| WO | WO-2007106919 A1 * | 9/2007 | E02F 9/2833 |
| WO | WO 2007106919 A1 | 9/2007 | |
| WO | WO 2011127536 A1 | 10/2011 | |

OTHER PUBLICATIONS

European Search Report for related Appiicatidn No. 16188989; dated Mar. 14, 2017.

* cited by examiner

REPLACEABLE WORK PART FOR A DEMOLITION TOOL

CROSS-REFERENCE TO RELATED APPLICATION

This Application is a 35 USC § 371 US National Stage filing of International Application No, PCT/EP2017/072947 filed on Sep. 12, 2017 which claims priority under the Paris Convention to European Patent Application No, 161889894 filed on Sep. 15, 2016.

TECHNICAL FIELD

The present disclosure generally relates to the field of demolition tools for crushing and/or cutting materials, in particular, to a replaceable work part for such a demolition tool.

BACKGROUND

Demolition tools for crushing and/or cutting materials are generally known. Typically, a demolition tool comprises a jaw assembly having a lower jaw and an upper jaw. The upper and lower jaws are pivotably connected and movable relative to each other. Work parts such as blades or teeth are provided on both the upper jaw and the lower jaw. A work material is crushed or cut by closing the upper jaw and the lower jaw using, for example, hydraulic actuators. The demolition tool further comprises a frame that connects the jaws to a jib of a machine.

For example, a demolition tool may have a jaw assembly that is suitable for crushing concrete and the like. The jaw assembly may be adapted for crushing or cutting other materials, for example, scrap iron and the like. The abrasive nature and hardness of some of these materials may cause a relatively rapid wear of the surfaces of the work parts that engage the materials.

Accordingly, a demolition tool is generally provided with replaceable work parts having wear surfaces. The work parts are connected to the jaw assembly using conventional techniques using, for example, fasteners and the like. The work parts may be provided both on the upper jaw and the lower jaw of the jaw assembly.

The present disclosure is directed, at least in part, to improving or overcoming one or more aspects of prior systems.

SUMMARY OF THE DISCLOSURE

According to one aspect of the present disclosure, a replaceable work part for a jaw assembly of a demolition tool comprises a base, a tooth portion provided on an upper side of the base, a first mounting leg extending downward from the base, and a second mounting leg extending downward from the base. The second mounting leg is spaced from the first mounting leg in a front-rear direction of the work part. The first mounting leg defines a first recess opening towards a rear side of the wear part. The first recess is configured for engagement with a first mounting structure formed on a jaw of the jaw assembly when the wear part is slid onto the jaw in the front-rear direction. The second mounting leg defines a second recess opening towards the rear side of the wear part. The second recess is configured for engagement with a second mounting structure formed on the jaw when the work part is slid onto the jaw in the front-rear direction.

According to another aspect of the present disclosure, a jaw assembly of a demolition tool comprises a first jaw and a second jaw pivotably connected to the first jaw. The jaw assembly further comprises a work part mounted to at least one of the first jaw and the second jaw by being slid onto the same in a front-rear direction. The work part comprises a base, a tooth portion provided on an upper side of the base, a first mounting leg extending downward from the base, and a second mounting leg extending downward from the base. The second mounting leg is spaced from the first mounting leg in a front-rear direction of the work part. The first mounting leg defines a first recess opening towards a rear side of the wear part. The first recess is configured for engagement with a first mounting structure formed on a jaw of the jaw assembly when the wear part is slid onto the jaw in the front-rear direction. The second mounting leg defines a second recess opening towards the rear side of the wear part. The second recess is configured for engagement with a second mounting structure formed on the jaw when the work part is slid onto the jaw in the front-rear direction. The jaw assembly further comprises at least one locking member for locking the work part in the front-rear direction after being slid onto the at least one of the first jaw and the second jaw.

Other features and aspects of the present disclosure become apparent from the following description and the accompanying drawings.

DETAILED DESCRIPTION

The following is a detailed description of exemplary embodiments of the present disclosure. The exemplary embodiments described herein are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of protection. Rather, the scope of protection shall be defined by the appended claims.

The present disclosure is based at least in part on the realization that, in particular, a central work part of a demolition tool such as a pulverizer needs to be protected against wear. The work part should be a replaceable part in order to eliminate weld repairs. Further, the work part should be easily mountable and removable to/from the demolition tool.

According to the present disclosure, this is achieved by providing a work part that slides into place on the demolition tool. Engagement portions formed on both ends of the work part in a front-rear direction of the same engage corresponding mounting structures formed on a jaw of the demolition tool as the work part is slid onto the same. Via this engagement, the work part is constrained in one direction, i.e., the vertical direction. The present disclosure is based at least in part on the realization that the work part can advantageously be constrained in a second direction, i.e., the sliding direction, by using a wedge part that is inserted between the work part and the jaw of the demolition tool. In particular, such a wedge part completely constrains the work part in the sliding direction, while it is not involved in the transfer of forces during normal operation. The transfer of forces is provided by the engagement portions formed on the work part.

Figure 1:
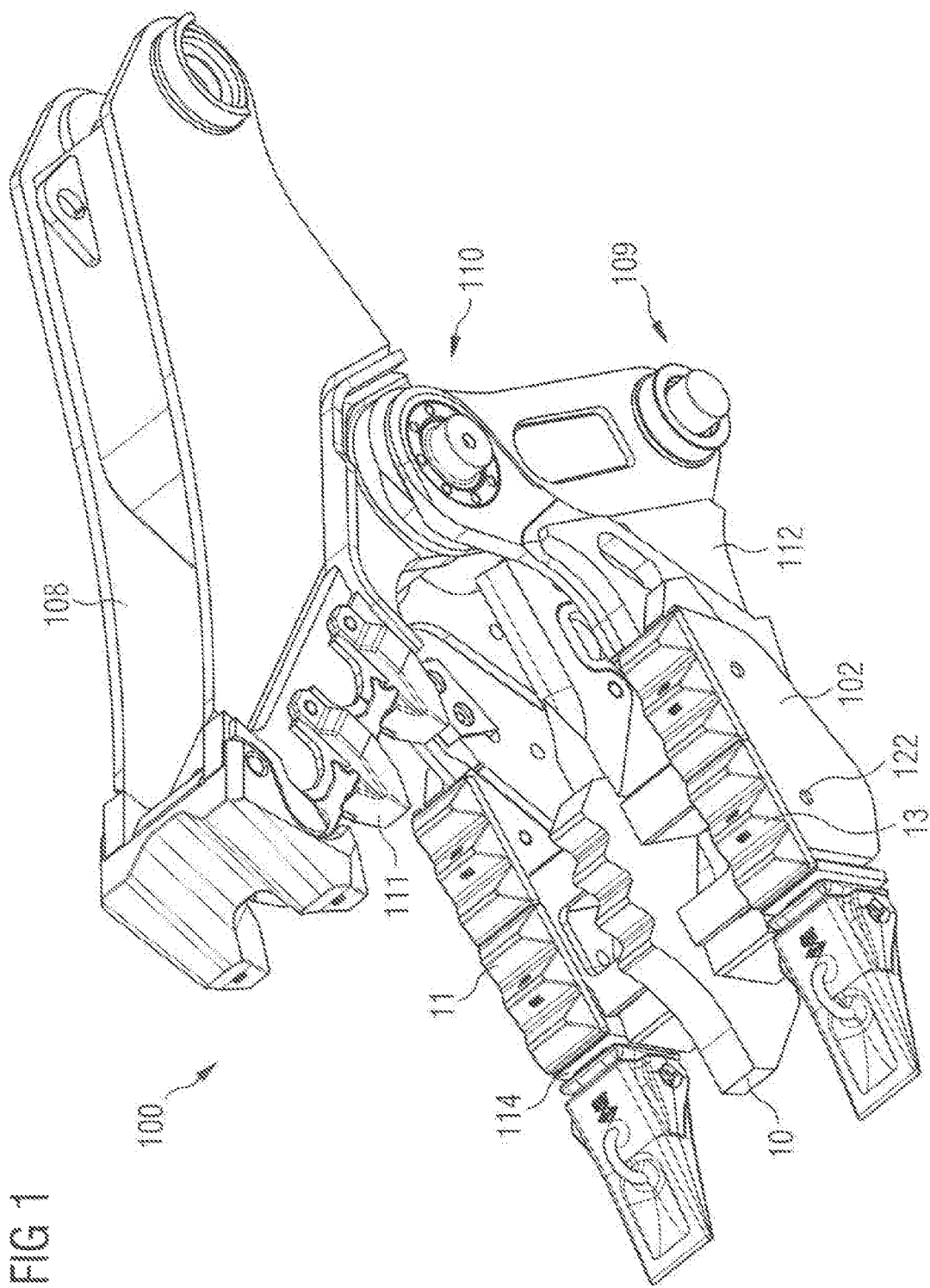
FIG. 1 is a perspective view of a jaw assembly in accordance with the present disclosure.

Referring to the drawings, FIG. 1 illustrates an exemplary embodiment of a jaw assembly 100 of a pulverizer. Jaw assembly 100 comprises a first jaw 102 and a second jaw 108. First jaw 102 and second jaw 108 are elongated members and connected to each other for mutual relative movement. In particular, first jaw 102 and second jaw 108 are connected through a pivot connection 110 at respective ends. As shown in FIG. 1, first jaw 102 and second jaw 108 have opposing surfaces onto which replaceable work parts such as a work part 10 and work modules 11, 13 are mounted. In the exemplary embodiment shown in FIG. 1, work part 10 and work modules 11, 13 are mounted to lower jaw 102 of jaw assembly 100. Corresponding wear parts, for example, a plurality of teeth 111 are mounted to upper jaw 108. The following description will focus on work part 10 mounted to lower jaw 102. However, it will be readily appreciated that, in other embodiments, work part 10 may also be mounted to upper jaw 108 or to both lower jaw 102 and upper jaw 108.

Lower jaw 102 has a first arm 112 and a second arm 114. Arms 112 and 114 are substantially T-shaped and have respective ends connected through pivot connection 110. Further, arms 112 and 114 are connected to each other at a plurality of positions in the longitudinal direction by transverse members extending between the same in the lateral direction (see, for example, FIG. 4).

At the ends connected through pivot connection 110, arms 112, 114 are provided with a further connection point 109 for attaching, for example, lower jaw 102 to a frame (not shown) of the pulverizer. It will be appreciated, however, that in other embodiments lower jaw 102 may be integrally formed with the frame of the pulverizer.

Figure 4:
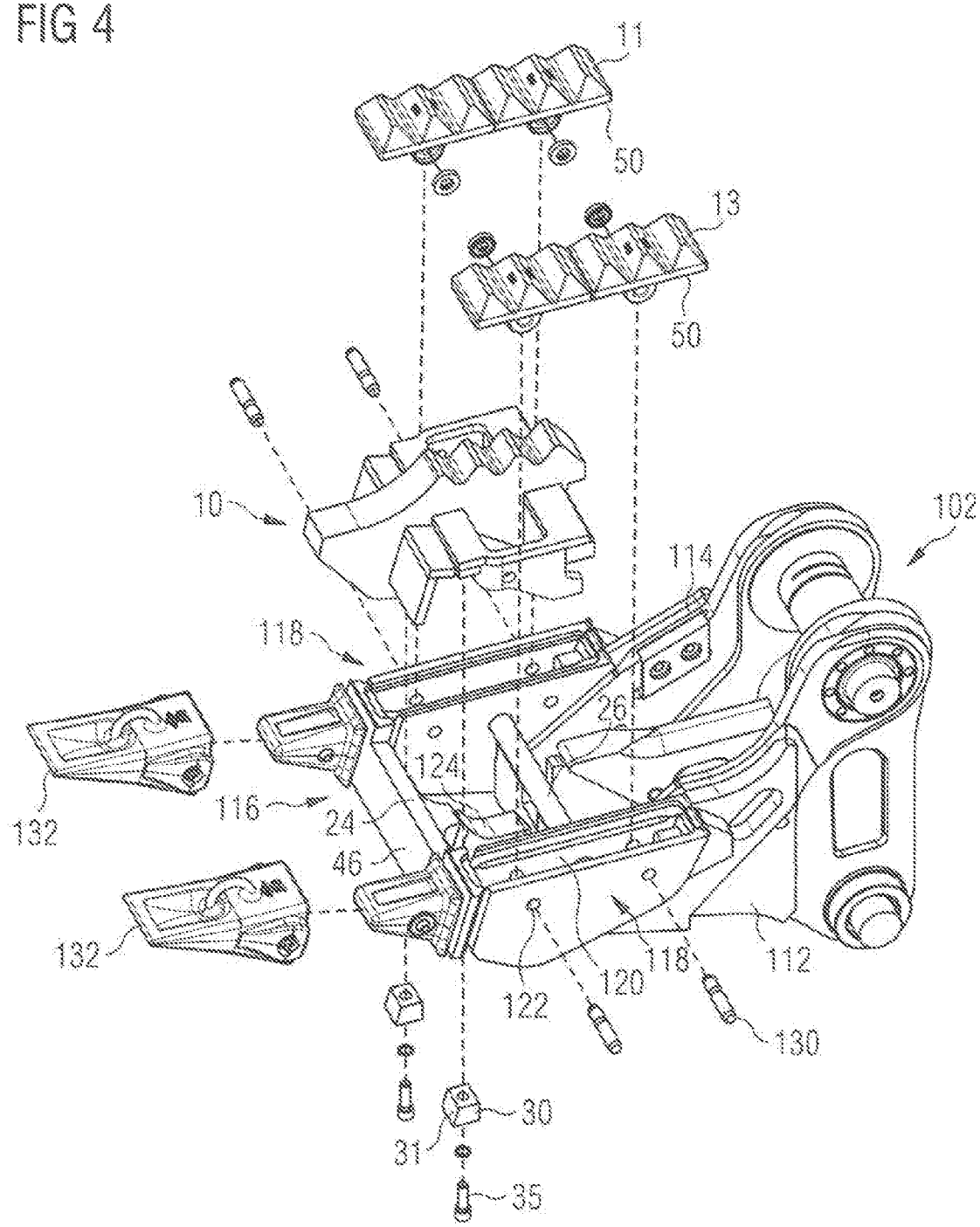
FIG. 4 is an exploded view illustrating an assembly of the jaw assembly of FIG. 1.

As shown in FIG. 4, first arm 112 and second arm 114 have a mounting portion 116 extending forward from the portion having the connection points. Mounting portion 116 includes seating portions 118 formed on upper surfaces of each of arms 112, 114, and a first mounting structure 24 and a second mounting structure 26 extending laterally between arms 112 and 114. Seating portions 118 are elongated and hollow members with a slot 120 formed in a top surface of the same. Slot 120 is elongated and parallel to the longitudinal axis of arms 112, 114. Holes 122 are formed in the sidewalls of arms 112, 114 below seating portions 118. Holes 122 detachably accommodate bolts or other fastening elements for mounting work modules 11, 13 on the respective seating portions 118, as will be described in more detail below.

In the exemplary embodiment, first mounting structure 24 is a substantially plate-like member extending between arms 112, 114 at a front end of the same. In the embodiment, first mounting structure 24 is inclined, i.e., extends at an angle with respect to the longitudinal direction of arms 112, 114, as will be described in more detail below. Second mounting structure 26 is formed as a rod-like member extending between arms 112, 114 disposed rearward from first mounting structure 24. A central portion 124 is formed on lower jaw 102 to extend rearward from first mounting structure 24. Central portion 124 is provided for increasing the structural strength of lower jaw 102.

Figure 2:
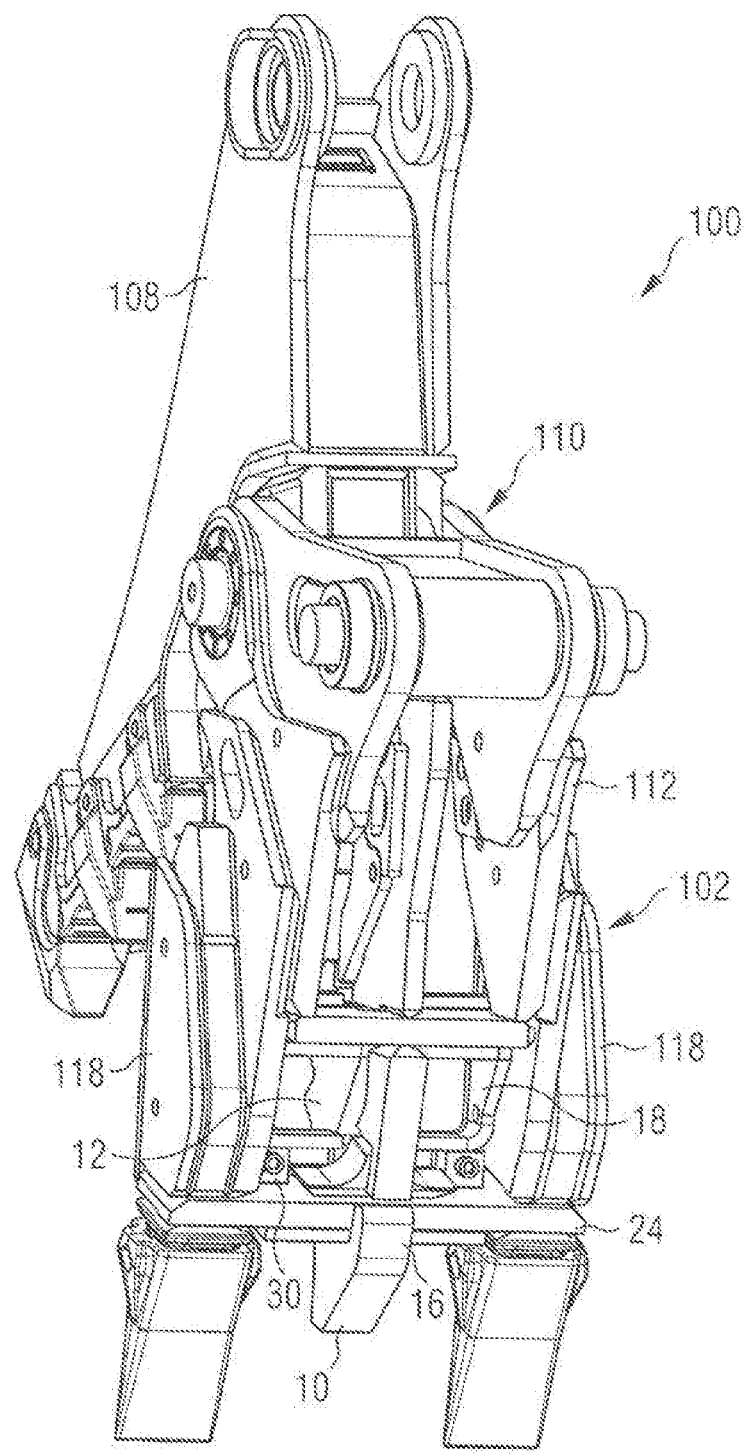
FIG. 2 is a rear perspective view of the jaw assembly of FIG. 1.

FIG. 2 illustrates a rear perspective view of jaw assembly 100 shown in FIG. 1. As shown in FIG. 2, work part 10 includes a base 12 and a first mounting leg 16 and a second mounting leg 18 extending downward from base 12. Work part 10 is mounted to jaw 102 via mounting legs 16, 18 and secured to jaw 102 by locking members 30 inserted between work part 10 and first mounting structure 24, as will be described in more detail below.

Figure 3A:
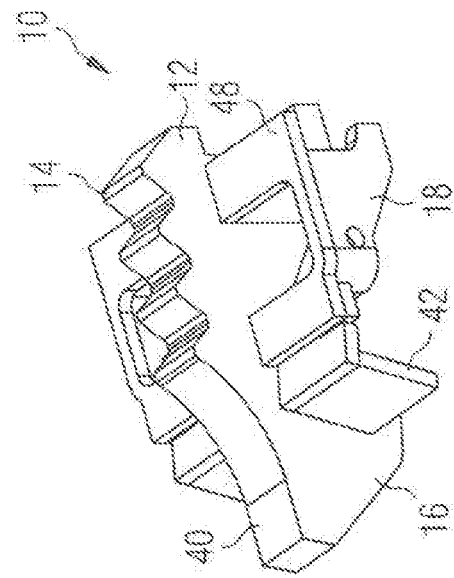
FIGS. 3A-3D are perspective views of a work part for the jaw assembly of FIG. 1 in accordance with the present disclosure.
Figure 3B:
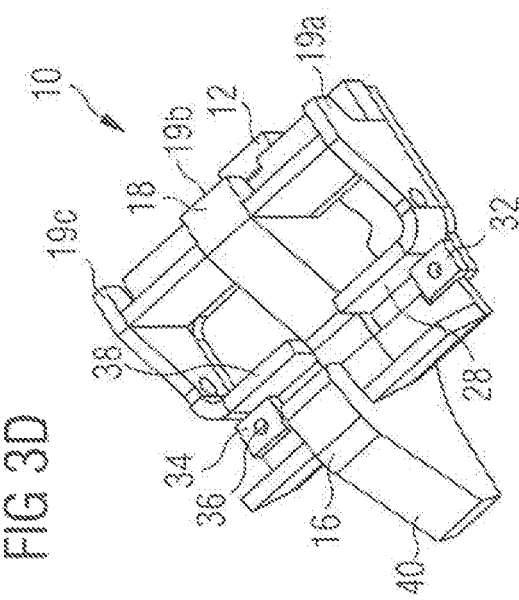
Figure 3C:
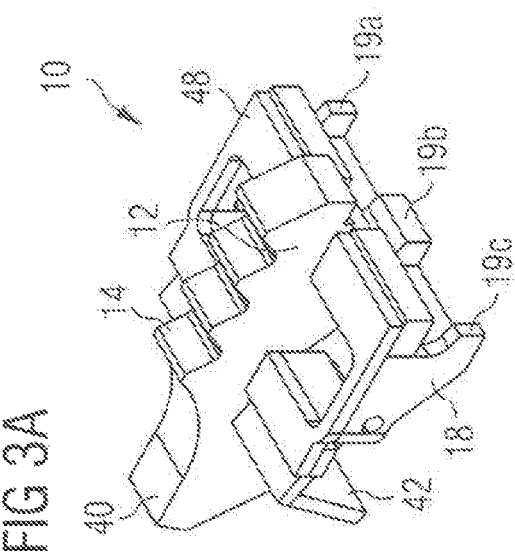
Figure 3D:
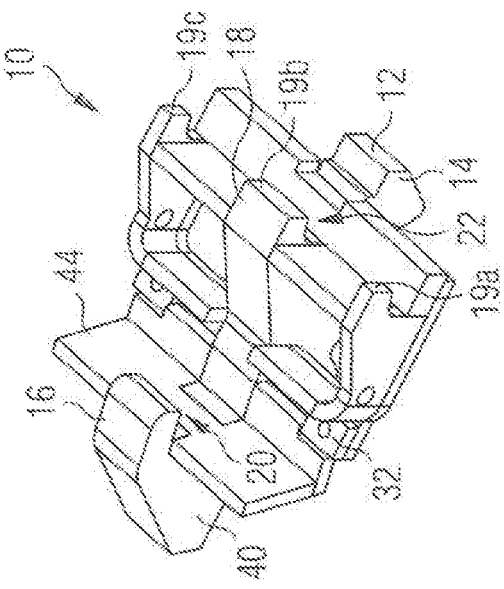

Referring to FIGS. 3A and 3D, a detailed configuration of work part 10 as an exemplary embodiment of the present disclosure is shown.

As shown in FIGS. 3A-3D, work part 10 includes a tooth portion 14 provided on an upper side of base 12. Tooth portion 14 is configured for crushing or cutting work material that is inserted between lower jaw 102 and upper jaw 108. First mounting leg 16 and second mounting leg 18 extend downward from base 12, each defining, at least in part, a recess for engaging first mounting structure 24 and second mounting structure 26, respectively. In particular, first mounting leg 16, which is integrally formed with base 12 and tooth portion 14 at a front end of work part 10, defines a first recess 20 configured for engagement with first mounting structure 24 formed on jaw 102. Likewise, second mounting leg 18 defines a second recess 22 for engaging second mounting structure 26 formed on jaw 102 (see FIG. 3C).

Work part 10 further includes an abutment surface 28 extending substantially orthogonal to the front-rear direction of the same. Abutment surface 28 is configured for abutment with at least one locking member, for example, a pair of locking members 30 (see FIG. 2) for locking work part 10 in the front-rear direction after sliding onto jaw 102. In the exemplary embodiment, abutment surface 28 is formed on a plate-like portion 38 extending downward from base 12 and disposed between first mounting leg 16 and second mounting leg 18 in the front-rear direction (see FIG. 3D). Work part 10 further comprises at least one attachment portion (mounting portion) 32 disposed adjacent to abutment surface 28, the at least one attachment portion 32 being configured to engage a fastening element 35 for fastening the at least one locking member 30 abutting against abutment surface 28 to work part 10 (see FIG. 4). In particular, the at least one attachment portion 32 includes a pair of attachment portions respectively provided on opposite sides of work part 10 in the transverse direction (see FIG. 3D). Further, each of the pair of attachment portions 32 includes a support surface 34 configured to support locking member 30 and a receiving portion 36 formed in support surface 34 and configured to receive fastening element 35. In the embodiment, support surface 34 is substantially perpendicular to abutment surface 28. Correspondingly, locking member 30 includes top and rear surfaces formed at an angle of 90 degrees with respect to each other (see FIG. 4).

As shown, for example, in FIG. 3B, first mounting leg 16 includes a laterally extended portion 42 extending outward from first recess 20. In particular, laterally extended portion 42, which is formed as a plate-like member, includes a rear surface 44 configured for alignment with a corresponding front surface 46 of first mounting structure 24 (see FIG. 4). In the embodiment, rear surface 44 also forms the rear surface of recess 20, i.e., the rear surface of laterally extended portion 42 is continuous with the rear surface of first recess 20. In the embodiment, base 12 is integrally formed with tooth portion 14, first mounting leg 16, second mounting leg 18 and a tip 40, for example, as a cast-iron part. A plurality of plate-like members, for example, a plate-like member forming laterally extended portion 42, is connected to the cast-iron part, for example, by welding or other appropriate techniques to form work part 10. It will be appreciated, however, that in other embodiments, work part 10 may be formed as a single integral part, or base 12 may not be integrally formed with one or more of tooth portion 14, tip 40, first mounting leg 16 and second mounting leg 18.

In the exemplary embodiment, first mounting leg 16 is formed as a hook-shaped member that extends downward from base 12 and defines first recess 20. In particular, in the embodiment, first mounting leg 16 extends at an angle with respect to the front-rear direction of work part 10 (i.e., the longitudinal direction of tooth portion 14). Accordingly, rear surface 44 also extends at this angle with respect to the front-rear direction of work part 10, which is the direction of sliding work part 10 onto jaw 102, as described in more detail below. For example, rear surface 44, i.e., first mounting leg 16, may extend at an angle of between 45° and 160°, preferably between 90° and 120°, in particular, 105°, with respect to the front-rear direction.

As shown in FIGS. 3A-3D, second mounting leg 18 includes a plurality of hook-shaped portions 19a, 19b, 19c laterally spaced from each other. Each hook-shaped portion 19a, 19b, 19c is configured to engage second mounting structure 26, i.e., the rod-like member shown in FIG. 4. As shown in FIGS. 3A-3D, in the embodiment, a central hook-shaped portion 19b is integrally formed with base 12. Further, hook-shaped portions 19a, 19c formed at the side ends of work part 10 are formed by appropriately shaped plate-like members connected to base 12. In the embodiment, hook-shaped portions 19a, 19c extend rearward from plate-like portion 38.

Work part 10 further comprises a plate portion 48 laterally extending from base 12 towards outer peripheral edges of work part 10. Plate portion 48 is configured for alignment with bases 50 of work modules 11, 13 after mounting work part 10 to jaw 102, as will be described in more detail below.

Mounting of work part 10 to jaw 102 of jaw assembly 100 will now be described in more detail with reference to FIG. 4.

As shown in FIG. 4, work part 10 is inserted in the space between arms 112, 114 from above, i.e., by moving the same in the vertical direction. In particular, work part 10 is inserted in such a manner that mounting legs 16 and 18 are disposed forward of mounting structures 24, 26 in the longitudinal direction of arms 112, 114. Generally, in the first stage of mounting work part 10, work part 10 is inserted into the space between arms 112, 114 such that mounting legs 16, 18 are disposed forward of mounting structures 24, 26 in a mounting direction or sliding direction, which is a direction of mounting work part 10 onto jaw 102 by sliding the same along the mounting/sliding direction. In this state, work part 10 is freely movable both in the vertical direction and the mounting direction (in the present case, the horizontal direction). However, lateral movement of work part 10 is restricted by inner side surfaces of arms 112, 114.

After work part 10 has been inserted between arms 112, 114, work part 10 is moved along the mounting direction, i.e., rearward, in order to engage first mounting leg 16 with first mounting structure 24 and second mounting leg 18 with second mounting structure 26. In particular, by sliding work part 10 in the mounting direction, first mounting structure 24 is inserted into first recess 20, and second mounting structure 26 is inserted into second recess 22. In other words, work part 10 is moved along the mounting direction until the rear surface of hook-shaped portion 19b abuts against second mounting structure 26, with the distal end portion of first mounting leg 16 reaching around plate-like mounting structure 24 (see FIG. 2). At this position, each of hook-shaped portions 19a, 19b, 19c extends around rod-like mounting structure 26, which is received in second recess 22. In this state, movement of work part 10 in the vertical direction is restricted. In other words, the only remaining degree of freedom is movement of work part 10 in the direction opposite to the mounting direction, i.e., the front-rear direction.

In order to secure work part 10 to jaw 102 after sliding onto the same, a pair of locking members 30 is inserted between work part 10 and jaw 102 from below and secured to work part 10 by fastening elements such as bolts 35. In particular, as shown in FIG. 2, the dimensions of work part 10 and jaw 102 may be such that a distance between a rear surface of plate-like mounting structure 24 and abutment surface 28 formed on plate-like portion 38 is such that locking members 30 may be inserted between the same from below to come into abutment with supporting surface 34 and abutment surface 28. As shown in FIG. 4, in the present embodiment, plate-like mounting structure 24 is formed at an angle with respect to the vertical direction, i.e., extends at an angle with respect to the front-rear direction. Correspondingly, as shown in FIG. 4, each locking member 30 has a wedge-like shape, i.e., includes a tapered front surface 31 configured for alignment with the rear surface of plate-like mounting structure 24. As such, locking member 30 may be easily inserted in the space between work part 10 and mounting structure 24.

After insertion into the space between work part 10 and mounting structure 24, locking members 30 are attached to work part 10 by bolts 35. It will be appreciated that in other embodiments locking members 30 may be attached to work part 10 in a different manner, for example, by rivets, brackets, or other fastening elements. With locking members 30 being fixed to work part 10, movement of work part 10 in the direction opposite to the mounting direction, i.e., the rear-front direction, is also restricted, because locking members 30 are wedged between work part 10 and jaw 102. In this state, movement of work part 10 is completely restricted, i.e., work part 10 cannot move in the lateral, the vertical or the front-rear direction. At the same time, the transfer of forces during operation of jaw 102 is affected mainly via mounting legs 16, 18, in particular, the inner surfaces of second mounting leg 18 defining second recess 22 and the bottom surface of laterally extended portion 42 of first mounting leg 16 resting on the top surface of first mounting structure 24, and not via locking members 30. This may increase the durability of the connection of locking members 30 to work part 10, and reduce wear of locking members 30. As such, locking members 30 may be re-used when work part 10 is exchanged by removing bolts 35 and removing locking members 30. After locking members 30 have been removed, work part 10 can be conveniently removed from jaw 102 by being moved first in the direction opposite to the mounting direction, i.e., the front-rear direction, and then by lifting the same upwards to be extracted from jaw 102.

In the present embodiment, after work part 10 has been mounted to jaw 102 in the above-described manner by attaching locking members 30, work modules 11, 13 are respectively mounted to seating portions 118 and attached by pins 130. In this state, bases 50 of work modules 11, 13 are aligned with the top surface of work part 10, in particular, the top surface of plate portion 48, further securing work part 10 in the vertical direction. Finally, tips 132 are also attached to front ends of arms 112, 114, as shown in FIG. 4. Accordingly, jaw 102 and jaw assembly 100 as shown in FIG. 1 are obtained by mounting the respective wear parts to jaws 102 and 108.

INDUSTRIAL APPLICABILITY

The industrial applicability of the systems and methods disclosed herein will be readily appreciated from the foregoing discussion. In particular, the replaceable work part of the present disclosure may be mounted to a jaw assembly of a demolition tool such as a multi-processor, a pulverizer, a crusher and the like having a set of jaws that close in order to crush or cut work materials. The replaceable work part may shield the jaw assembly from wear during demolition operations, and may be made of materials suitable for the associated crushing or cutting operations.

In accordance with the present disclosure, the replaceable work part may be easily and efficiently mounted to and removed from the jaw assembly. In particular, the work part of the present disclosure may be easily mounted to a jaw of the jaw assembly by first inserting the same from above into the jaw, and then sliding the work part onto the jaw in a mounting direction. By the sliding movement, engagement portions formed at two positions that are separated in the mounting direction are brought into engagement with the corresponding mounting structures formed on the jaw in order to restrict movement of the work part in the vertical direction.

It will be appreciated that many different configurations can be used for these engagement portions. For example, while in the embodiment a plurality of hook-like mounting legs are shown, in other embodiments, appropriately shaped mounting recesses may be formed in rear surfaces of mounting portions of work part 10 that are separated in the front-rear direction and configured to engage corresponding mounting projections formed on jaw 102 at the corresponding positions in the front-rear direction. Any appropriate configuration can be used, as long as the mounting projections formed on the jaw are brought into engagement with the mounting recesses formed on the work part by sliding the work part along the mounting direction to achieve a configuration in which the movement of work part 10 in the vertical and lateral directions is restricted.

Once this assembly state has been obtained, in a second stage of mounting work part 10 to jaw 102, an appropriate locking member 30 is inserted between work part 10 and jaw 102 in such a manner that movement of work part 10 with respect to jaw 102 in the remaining direction, i.e., the direction opposite to the mounting direction, is also restricted to completely restrict movement of work part 10 with respect to jaw 102. Any appropriate locking member(s) may be used, and the one or more locking members may be attached to work part 10 and/or jaw 102 in any appropriate manner, as long as the locking member(s) is (are) prevented from coming loose during operation of the demolition tool.

It will be readily appreciated that any appropriate number of mounting legs may be used. For example, while the embodiment includes a first mounting leg 16 and a second mounting leg 18, in other embodiments, more than two mounting legs that are separated in the front-rear direction may be provided. Further, it will be appreciated that, although in the embodiment first mounting leg 16 includes a single hook-shaped portion, and second mounting leg 18 includes three hook-shaped portions 19a, 19b, 19c, in other embodiments, each mounting leg may include different numbers of, for example, hook-shaped portions.

Likewise, in the embodiment, mounting recesses 20, 22 are defined in part by mounting legs 16, 18. In particular, first recess 20 is defined by a bottom surface of base 12 and the inner surfaces of hook-shaped mounting leg 16 extending from the bottom surface of base 12. It will be readily appreciated, however, that in other embodiments the respective recesses 20, 22 may be formed in the corresponding mounting legs 16, 18, for example, rear surfaces of the same. In other words, inner surfaces of each recess may not be defined in part by a bottom surface of base 12.

Further, as mentioned above, while in the embodiment respective recesses 20, 22 extend through the respective mounting legs 16, 18 in the lateral direction, in other embodiments, the recesses 20, 22 may not extend all the way through mounting legs 16, 18. For example, each recess may be formed as a slot, a rectangular, circular, annular or any other recess formed in a rear surface of the corresponding mounting leg.

Finally, while locking members 30 are shown as wedge-shaped members in the embodiment described herein, it will be readily appreciated that in other embodiments locking members 30 may have different shapes, for example, cube-like in case plate-like mounting structure 24 extends perpendicular to the front-rear direction, i.e., is not inclined with respect to the vertical direction.

The foregoing description provides examples of the disclosed systems and methods. However, it is contemplated that other implementations of the disclosure may differ in detail from the foregoing examples. All references to the disclosure or examples thereof are intended to reference the particular example being discussed at that point and are not intended to imply any limitation as to the general disclosure.

Recitation of ranges of values herein are merely intended to serve as a shorthand method for referring individually to each separate value falling within the range, unless otherwise indicated herein, and each separate value is incorporated into the specification as if it were individually recited herein. All methods described herein can be performed in any suitable order, unless otherwise indicated or clearly contradicted by context.

Although the preferred embodiments of the present disclosure have been described herein, improvements and modifications may be incorporated without departing from the scope of the following claims.

The invention claimed is:

1. A replaceable work part configured to be mounted to a jaw of a jaw assembly of a demolition tool, the replaceable work part comprising:
   a base that includes an upper side and a bottom side;
   a tooth portion provided on the upper side of the base, the tooth portion disposed between a front side and a rear side of the replaceable work part, the front side and the rear side of the replaceable work part defining a front-rear direction of the replaceable work part;
   a first mounting leg extending downward from the base, the first mounting leg including a first portion that extends in the front-rear direction underneath the bottom side of the base; and
   a second mounting leg extending downward from the base, the second mounting leg including a first section that is disposed below the bottom side of the base and extends in the front-rear direction of the replaceable work part, the second mounting leg being spaced from the first mounting leg in the front-rear direction of the replaceable work part, wherein the first mounting leg defines a first recess, the first recess oriented to open towards the rear side of the replaceable work part, the first recess configured to receive a first mounting structure of the jaw of the jaw assembly as the replaceable work part is slid onto the jaw in the front-rear direction, and wherein the second mounting leg defines a second recess, the second recess oriented to open towards the rear side of the replaceable work part, the second recess configured to receive a second mounting structure of the jaw as the replaceable work part is slid onto the jaw in the front-rear direction.

2. The replaceable work part of claim 1, further comprising an abutment surface extending substantially orthogonal to the front-rear direction and being configured for abutment with at least one locking member for locking the replaceable work part in the front-rear direction after sliding onto the jaw.

3. The replaceable work part of claim 2, further comprising at least one attachment portion disposed adjacent to the abutment surface, the at least one attachment portion being configured to engage a fastening element for fastening the at least one locking member abutting against the abutment surface to the replaceable work part.

4. The replaceable work part of claim 3, wherein the at least one attachment portion includes a pair of attachment portions respectively provided on opposite sides of the replaceable work part in a transverse direction.

5. The replaceable work part of claim 3, wherein the at least one attachment portion includes a support surface configured to support the locking member and a receiving portion formed in the support surface and configured to receive the fastening element.

6. The replaceable work part of claim 5, wherein the support surface is perpendicular to the abutment surface.

7. The replaceable work part of claim 2, wherein the abutment surface is formed on a plate-like portion extending downward from the base, the plate-like portion being disposed between the first mounting leg and the second mounting leg in the front-rear direction.

8. The replaceable work part of claim 1, further comprising a tip extending forward from the first mounting leg.

9. The replaceable work part of claim 8, wherein the tip, the first mounting leg and the tooth portion are integrally formed with the base.

10. The replaceable work part of claim 1, wherein the first mounting leg includes a laterally extended portion extending outward from the first recess, the laterally extended portion defining a rear surface configured for alignment with a corresponding front surface of the first mounting structure.

11. The replaceable work part of claim 1, wherein the first mounting leg is formed as a hook-shaped member that extends downward from the base and defines the first recess.

12. The replaceable work part of claim 1, wherein the second mounting leg includes a plurality of hook-shaped portions laterally spaced from each other, each hook-shaped portion being configured to engage the second mounting structure.

13. The replaceable work part of claim 1, further comprising a plate portion laterally extending from the base towards outer peripheral edges of the replaceable work part, the plate portion being configured for alignment with bases of a pair of work modules to be mounted on respective left and right arms of the jaw after sliding the replaceable work part onto the jaw.

14. A jaw assembly of a demolition tool, comprising:
a first jaw and a second jaw pivotably connected to the first jaw;
the replaceable work part of claim 1 mounted to at least one of the first jaw and the second jaw by being slid onto the same in the front-rear direction; and
at least one locking member for locking the replaceable work part in the front-rear direction after being slid onto the at least one of the first jaw and the second jaw.

15. The jaw assembly of claim 14, wherein the locking member is a wedge-shaped locking member inserted into the jaw assembly from below.

* * * * *